Dec. 24, 1957    S. LUBKIN    2,817,829

MAGNETIC RECORDING SYSTEM

Filed July 23, 1953    3 Sheets-Sheet 1

INVENTOR.
SAMUEL LUBKIN

BY S. C. Yuter

ATTORNEY

INVENTOR.
SAMUEL LUBKIN
BY S. C. Yuter
ATTORNEY.

INVENTOR.
SAMUEL LUBKIN
BY S.C. Yuter
ATTORNEY 2,817,829
Patented Dec. 24, 1957

2,817,829

MAGNETIC RECORDING SYSTEM

Samuel Lubkin, Brooklyn, N. Y., assignor to Underwood Corporation, New York, N. Y., a corporation of Delaware Application July 23, 1953, Serial No. 369,923
16 Claims. (Cl. 340—174)

This invention relates to the use of a magnet recording medium as a storage device for a data processor such as an electronic digital computer. More particularly, it relates to a method of and apparatus for transferring information items between an electronic digital computer and a magnetic recording tape.

Magnetic recording tape has heretofore been used with electronic digital computers as a storage medium for numerical information recorded thereon in the form of magnetized spots. Such information may be recorded on the tape using the binary system of notation wherein the binary digits "1" and "0" may be expressed by the presence or absence of a particular condition; for example, the presence or absence of a given magnetic state on a unit area of the magnetic recording tape.

Unfortunately, the quality of the presently available magnetic recording tape is poor mainly due to non-uniformity of the magnetic coating of the tape. Therefore, signals recorded in areas of the tape which have unacceptable magnetic properties will result, during playback, in the production of playback signals having magnitudes which are unusable.

This defect has been met heretofore by using a magnetic tape in which the imperfect portions of the tape have been physically deleted while the acceptable portions are spliced together. However, the splices may result in improper operation of the computer due to the generation of unwanted signals at the spliced junctions.

Another solution has been to simultaneously record the same data in two or more channels of the tape since the occurrence of defective areas in all of the positions carrying the same data is very remote. However, half or more of the tape is wasted.

A further solution is to use magnetic tape wherein a hole is punched in an area preceding an imperfection and in an area succeeding the imperfection such that the computer will be disabled while the tape area between the two holes passes the sensing device. However, this process is also wasteful as the holes may be punched in areas of the tape which have acceptable magnetic properties.

A more efficient solution is to use sprocketed magnetic tape of the type described and claimed in the co-pending application of Samuel Lubkin, Serial No. 369,927, filed July 23, 1953, and assigned to the same assignee; wherein a plurality of pulse signals are recorded in discrete areas of the tape corresponding to sections of the tape which have acceptable magnetic properties. This type of magnetic tape minimizes the difficulties caused by the presence of defective areas without wasting substantial portions of the magnetic tape.

Accordingly, the main object of the invention is the use of a sprocketed magnetic tape as a storage medium.

Another object is to provide a method of and apparatus for transferring information items between an electronic digital computer and sprocketed magnetic tape.

A further object of the invention is the use of a sprocketed magnetic tape having a high degree of reproduction accuracy including a method of and means for controlling the transfer of items of information from the areas of the sprocketed tape which have acceptable magnetic properties to the computer according to the presence of the sprocket signals.

A still further object of the invention is to provide a method of and means for transferring information items from the computer to sprocketed magnetic tape under control of the sprocket signals.

In accordance with the invention, the magnetic storage system employs a sprocketed magnetic tape having sprocket signals recorded therein for identifying areas of the tape which have acceptable magnetic properties. The sprocket signals are utilized to control the transfer of information between the computer and the sprocketed tape such that a transfer operation will only occur when a sprocket signal is sensed.

A feature of the invention is the provision of a transfer device including a gating circuit which operates in response to the sprocket signals to pass information items therethrough.

An advantage of the invention is that the sprocket signals may be employed to control both the transfer of information from the computer to the tape and from the tape to the computer.

Other objects, features and advantages of the invention will appear in the subsequent detailed description which is accompanied by drawings wherein.

*Introduction*

Figure 1:
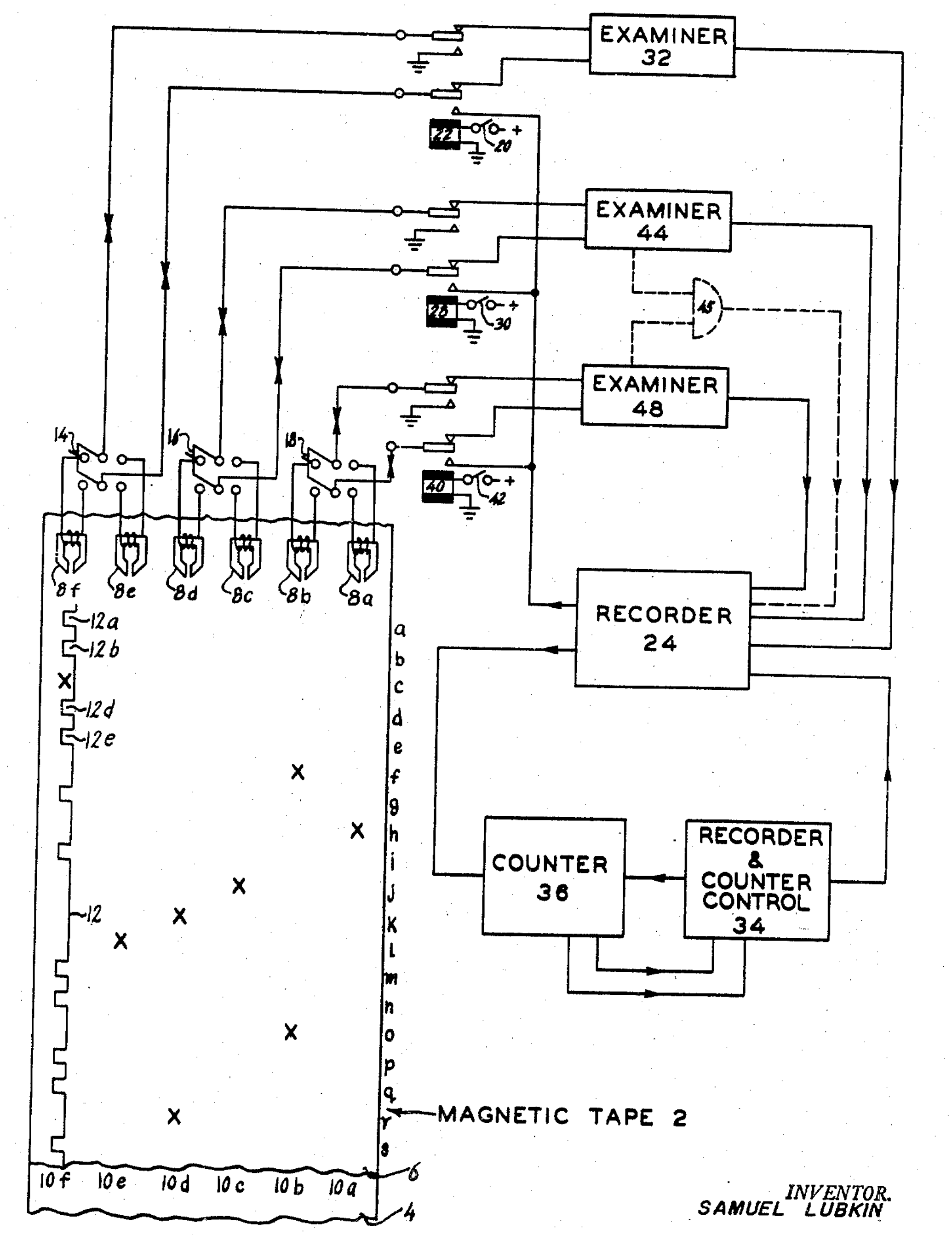
Figure 1 shows a fragmentary view of the magnetic tape being processed (with the magnetic impressions of the signals pictorially illustrated) and includes a schematic block diagram of the apparatus for processing the non-sprocketed tape.

Referring more particularly to the tape processing apparatus shown in Figure 1, the magnetic tape 2 comprises a flexible nonmagnetic body 4 and a coating or surface 6. The body 4 may be made of any nonmagnetic material having the requisite tensile strength such as paper, or a plastic, or a synthetic resin, or a nonmagnetizable metal. The surface 6 is a very thin layer containing a substantially uniform distribution of permanently magnetizable material; for example, red iron oxide. The thickness of the surface 14 is in the order of .0005 inch.

The magnetic tape 2 is supported by a tape reeling mechanism (not shown) which moves the tape past the reading-recording heads 8. Each reading-recording head 8 sweeps one of a plurality of parallel channels 10, which are longitudinally positioned along the tape 2. Six channels (channels 10*a*–10*f*) are shown in Fig. 1. However, any number of channels or only one channel may be employed as will be explained hereinafter.

The magnetic taper 2 is processed by first examining the discrete areas of one channel for acceptable magnetic properties. Then the discrete areas of the other channels adjacent to the discrete areas of the first channel are examined for acceptable magnetic properties. Finally, a sprocket pulse signal train 12 is recorded on the magnetic tape 2 in the discrete areas of one channel which are adjacent to the discrete areas of the last examined channel having acceptable magnetic properties. The size of the discrete areas are preferably chosen so that a single pulse can be readily recorded therein when the magnetic tape 2 is used in conjunction with a computer.

For convenience of description, the magnetic tape 2 is divided into transverse sections *a*, *b*, *c* and so on. The transverse sections extend across the magnetic tape 2 perpendicular to the channels 10 and include a single discrete area in each channel. In addition, each discrete area of the magnetic tape 2 capable of storing a unit of information is designated by a position reference character corresponding to a channel number and a transverse section letter. For example, a discrete area of the magnetic tape 2 which has unacceptable magnetic properties (hereinafter designated by an "*x*") is located at position 10*a–h*. The channel containing the sprocket pulse signal train 12 will hereinafter be termed the sprocket channel 10*f*. The sprocket pulse signal train 12 comprises the sprocket pulse signals 12*a*, 12*b*, 12*d*, 12*e* and so on.

Therefore, a sprocket pulse signal will be recorded in a discrete area of the magnetic tape 2 which is included in a transverse section of adjacent discrete areas of the channels 10 which has acceptable magnetic properties. If one discrete area in a section has a defect, no sprocket pulse signal will be recorded in the corresponding discrete area of the sprocket channel 10*f*. After the sprocket pulse signal train 12 is recorded, all other signals in the remaining channels 10*a*—10*e* are erased.

The channels 10 may be examined in any order. For example, the channels 10 may be examined in the following sequence: channel 10*a*, channel 10*c*, channel 10*e*, channel 10*b*, channel 10*d* and channel 10*f*. Another sequence of examination would be channel 10*a*, channel 10*d*, channel 10*f*, channel 10*b*, channel 10*e* and channel 10*c*. It is preferable that the sequence be chosen so that reading and recording is not performed simultaneously in adjacent channels so that difficulties of the "crosstalk" problem may be avoided. However, if proper precautions are taken, such as spacing the magnetic heads properly or shielding the magnetic heads from each other, so as to minimize the "crosstalk" problem, the reading and recording operation may be performed in adjacent channels. Further, if these precautions are taken all of the information channels may be examined simultaneously. Of course, the magnetic tape 2 is not limited to a particular number of channels 10, and any channel 10 may be utilized to store the sprocket pulse signal train 12. Further, in the case of a magnetic tape 2 carrying only one channel, the sprocket pulse signal train may be recorded in discrete areas of the channel which are adjacent to or which correspond to the discrete areas of the channel which have acceptable magnetic properties, as for example by recording in alternate discrete areas of the channel.

*General description of the method and apparatus for processing a magnetic tape*

One type of apparatus suitable for processing the magnetic tape 2 is illustrated particularly in Fig. 1. The channels 10 are examined in the following sequence: Channel 10*f*, 10*d*, 10*b*, 10*e*, 10*c* and 10*a*. Double-pole double throw switches 14, 16 and 18 are fixed in the left hand position to place reading-recording heads 8*f*, 8*d* and 8*b*, respectively, in operation. Relay switch 20 is closed to connect relay 22 between a positive supply bus and ground. A first pulse signal train is generated by recorder 24 and is fed by means of the lower contact arm of the energized relay 22 to one terminal of the reading-recording head 8*f*. The upper contact arm of relay 22 grounds the other terminal of the reading-recording head 8*f* to complete the recording circuit. The first pulse signal train is recorded in channel 10*f* as the magnetic tape 2 moves past the reading-recording head 8*f*.

After the first pulse signal train is recorded in channel 10*f*, relay 22 is de-energized by opening relay switch 20 and relay 28 is energized by closing relay switch 30. The reading-recording head 8*f* is then coupled to the examiner 32 by means of the contact arms of relay 22.

The examiner 32 functions to generate and transmit a pulse signal to recorder 24 for each discrete area of channel 10*f* examined which has magnetic properties equal to or greater than a given standard as indicated by the amplitude of the playback signal generated in the reading-recording head 8*f* as the first pulse signal train is played back.

The recorder 24 is connected to one terminal of reading-recording head 8*b* by means of the lower contact arm of energized relay 28. The upper contact arm of relay 28 connects the other terminal of the reading-recording head 8*d* to ground to complete the recording circuit.

If the magnetic properties of each discrete area being examined meet the minimum requirements as reflected by the amplitude of the playback signal, the examiner 32 generates and transmits via the recorder 24 a pulse signal which is recorded in a corresponding position in channel 10*d*. Therefore, a second pulse signal train similar to the first pulse signal train will be recorded in channel 10*d*. For example, if the passage of position 10*f–a* by the magnetic head 8*f* produces a signal of acceptable amplitude, a pulse having a shape similar to the shape of the previous recording signal will be recorded in position 10*d–a*. If the discrete area of a particular position has poor magnetic properties such as position 10*f–c*, then a pulse signal will not be recorded in the corresponding position 10*d–c*.

This examination procedure is repeated with respect to the signals recorded in channel 10*d*, and a third pulse signal train is recorded in channel 10*b*. In other words, if the discrete area of a particular position in channel 10*d* has acceptable magnetic properties, then a corresponding signal will be recorded in channel 10*b*. During this operation double-pole double throw switch 14 is opened to prevent the pulse signal train previously recorded in channel 10*f* from being read by reading-recording head 8*f* and transmitted to recorder 24. Relay 28 is de-energized by opening relay switch 30 and relay 40 is energized by closing relay switch 42. The reading-recording head 8*d* is coupled to the examiner 44 via the contact arms of relay 28. The examiner 44 functions to generate and transmit a pulse signal to recorder 24 for each discrete area of channel 10*d* examined which has magnetic properties equal to or greater than a given standard as indicated by the amplitude of the playback signal generated in the magnetic head 8*d* as the second pulse signal train is played back.

The recorder 24 is connected to one terminal of the reading-recording head 8*b* by means of the lower contact arm of energized relay 40. The upper contact arm of relay 40 connects the other terminal of the magnetic head 8*b* to ground to complete the recording circuit.

If the magnetic properties of each discrete area being examined meet the minimum requirements as reflected by the amplitude of the playback signal, the examiner 44 generates and transmits via recorder 24 a pulse signal which is recorded in a corresponding position in channel 10*b*. Therefore, a third pulse signal train similar to the second pulse signal train will be recorded in channel 10*b*. For example, if the passage of position 10*d–a* by the magnetic head 8*d* produces a signal of acceptable amplitude, a pulse having a shape similar to the shape of the previous recording pulse signal will be recorded in position 10*b–a*. If the discrete area of a particular position has poor magnetic properties then a pulse signal will not be recorded in the corresponding position in channel 10*b*.

The examination procedure is again repeated with respect to the signals recorded in channel 10*b* and a fourth pulse signal train is recorded in channel 10*e*. In other words, if the discrete area of a particular position in channel 10*b* has acceptable magnetic properties, then a corresponding pulse signal will be recorded in channel 10*e*. During this operation double-pole double throw switch 16 is opened to prevent the pulse signal train previously recorded in channel 10*d* from being read by reading-recording head 8*d* and transmitted to recorder 24. Further, double-pole double throw switch 14 is fixed in the right hand position to connect reading-recording head 8*e* in a recording circuit, relay 40 is de-energized by opening switch 42 and relay 22 is energized by closing switch 20. The reading-recording head 8*b* is coupled to the examiner 48 via the contact arms of relay 40 and the output of examiner 48 is applied to the input of recorder 24.

The examiner 48 functions to generate and transmit a pulse signal to recorder 24 for each discrete area of channel 10*b* examined which has magnetic properties equal to or greater than a given standard as indicated by the amplitude of the playback signal generated in the reading-recording head 8*b* as the third pulse signal train is played back.

The recorder 24 is connected to one terminal of the reading-recording head 8*e* by means of the lower contact arm of energized relay 22. The upper contact arm of relay 22 connects the other terminal of the reading-recording head 8*e* to ground to complete the recording circuit.

If the magnetic properties of the discrete area being examined meet the minimum requirements as reflected by the amplitude of the playback signal, the examiner 48 generates and transmits via recorder 24 a pulse signal which is recorded in channel 10*e*. Therefore, a fourth pulse signal train similar to the third pulse signal train will be recorded in corresponding positions in channel 10*e*. For example, if the passage of position 10*b–a* by the reading-recording head 8*b* produces a signal of acceptable amplitude, a pulse having a shape similar to the shape of the previous recording pulse signal will be recorded in position 10*e–a*. If the discrete area of a particular position has poor magnetic properties then a pulse signal will not be recorded in the corresponding position in channel 10*e*.

Thus a pulse signal will be recorded in channel 10*e* in every position which corresponds to the adjacent positions in channels 10*f*, 10*d* and 10*b*, which have acceptable magnetic properties.

Double-pole double throw switches 16 and 18 are then placed in the appropriate positions and a procedure similar to that for examining channels 10*f*, 10*d* and 10*b*, is followed to examine channels 10*e*, 10*c* and 10*a*. That is, channel 10*e* is examined and the pulse signals of acceptable amplitude are transferred to corresponding positions in channel 10*c*, channel 10*c* is examined and the pulse signals of acceptable amplitude are transferred to corresponding positions in channel 10*a*.

Thus a pulse signal will be recorded in channel 10*a* in every position which corresponds to the adjacent positions in channels 10*e* and 10*c*, which have acceptable magnetic properties.

When the six channels have been processed the final operation is to transfer the pulse signal train in channel 10*a* to channel 10*f*, called sprocket channel 10*f*, in spaced blocks of sprocket pulse signals. The completely sprocketed magnetic tape is preferably chosen to consist of blocks of sprocket pulse signals, each block comprising 640 rocket pulse signals, corresponding to blocks of information to be recorded on the magnetic tape 2. It should be noted, however, that the blocks of sprocket pulse signals are not necessarily limited to 640 sprocket pulse signals but may consist of any number of sprocket pulse signals.

The recorder and counter control 34 in its normal state functions during the processing of the magnetic tape to condition recorder 24 and decondition counter 36. During the final step of processing the magnetic tape, the recorder and counter control 34 will condition counter 36 to respond to the sprocket pulse signals that are being recorded in the sprocket channel 10*f*. The counter 36 will count a total of 640 sprocket pulse signals and will then cause recorder and counter control 34 to reset counter 36 and decondition recorder 24 for a period of forty milliseconds, which is the interval between blocks, so that it will not be responsive to sprocket pulse signals for that period of time. After this period the recorder and counter control 34 returns to its normal state and conditions both the recorder 24 and counter 36 to be responsive to the next 640 sprocket pulse signals. This procedure will be repeated so that the completely sprocketed magnetic tape will consist of spaced blocks of 640 sprocket pulse signals corresponding to blocks of information pulse signals.

Double-pole double throw switch 14 is fixed in the left hand position, double-pole double throw switch 18 is fixed in the right hand position, double-pole double throw switch 16 is opened to prevent the pulse signal trains previously recorded in channels 10*d* and 10*c* from being read by reading-recording heads 8*d* and 8*c* respectively and transmitted to recorder 24, relay 40 is de-energized by opening relay switch 42, relay 22 is energized by closing relay switch 20 and recorder and counter control 34 operates to condition counter 36 to be responsive to the final pulse signal train being transferred from channel 10*a* to the sprocket channel 10*f*.

Thus, a sprocket pulse signal will be recorded in each position of the sprocket channel 10*f* which corresponds to the adjacent positions in channels 10*f*, 10*e*, 10*d*, 10*c*, 10*b* and 10*a* which have acceptable magnetic properties. The sprocket pulse signal train 12 is pictorially illustrated in idealized pulse form to represent the flux patterns of the magnetic impressions on the surface 6 of the magnetic tape 2 since the flux patterns are not visually discernible. Further, it should be noted that the various recording pulse signal trains need not be necessarily limited to square wave shape nor need the interval between pulse signals be necessarily equal. This sprocket pulse signal train is retained in the sprocket channel 10*f* while all signals present in the remaining channels 10*a* to 10*e* are erased. Magnetic tape 2 is then ready to be utilized as a magnetic storage device in an electronic digital computer which will only store information items in positions on the magnetic tape 2 adjacent to the sprocket positions.

The examiners 32, 44 and 48, the recorder 24, the counter 36 and the recorder and counter control 34 are described in detail in the co-pending application of Samuel Lubkin, Serial No. 369,927, filed July 23, 1953, and assigned to the same assignee.

Briefly, however, each of the examiners 32, 44 and 48 comprises a tape-reading amplifier, an amplitude discriminator and a delay flip flop connected in series. A signal received by an examiner is amplified by its tape-reading amplifier and is fed to the associated amplitude discriminator. The amplitude discriminator generates an output signal when the signal received from the tape-reading amplifier exceeds a predetermined level of magnitude. The signal generated by the amplitude discriminator is passed to the delay flip flop which responds by producing an output signal for sixty microseconds. The period of the output signal is chosen such that there is sufficient time to read a signal from one channel and to record the signal on a second channel.

The recorder 24 comprises a pulse generator which is controllably coupled to the output terminal of the recorder and counter control 34 so that the recorder 24 is capable of supplying a series of pulses. Additionally, a network of relays and crystal-diode gates controllably couples input signals received from the examiners 32, 44 and 48 to the input terminals of the recorder 24. Signals which are fed to the output terminal of the recorder 24 are fed via a delay flip flop which responds to the signal pulses by producing output pulses having a time length of fifteen microseconds and which are passed to an amplifier.

The recorder and counter control 34 comprises a gate and a delay flip flop in series. The delay flip flop transmits signals through a delay line to the recorder 24 and via a differentiating circuit, an amplifier and relay, in series, to the counter 36. A signal is received by the gate of the recorder and counter control 34 from the counter 36 when the counter 36 has counted a block of sprocket pulse signals. The signal is fed via the gate to the delay flip flop which is thereby activated for a period of forty milliseconds. As a result, a signal is fed via the delay line to the recorder 24 and operates to prevent the recorder 24 from transmitting output signals for forty milliseconds. The delay flip flop is also coupled via the differentiating circuit to the pulse amplifier whose output terminal is coupled via the relay to the counter 36.

The counter 36 is a ten stage binary counter which is described in detail in the aforementioned co-pending application. The counter 36, however, may also comprise ten of the stages illustrated in the U. S. patent of Philip C. Michel, No. 2,324,314, issued July 13, 1943, entitled "Electronic Switch."

Another method of processing the magnetic tape 2 is to treat two or more channels logically as one channel. More specifically in the case of two channels the output of examiners 44 and 48 is applied to gate 45 such that a recording in channel 10*e*, for example, is conditional upon both signals recorded in channels 10*c* and 10*b* reaching the acceptance level. Therefore, the channels 10 may be examined in the following sequence: channel 10*f*, channels 10*c* and 10*b*, channel 10*e*, channels 10*d* and 10*a*. That is, channel 10*f* is examined and the pulse signals of acceptable amplitude are transferred to corresponding positions in channels 10*c* and 10*b*, channels 10*c* and 10*b* are simultaneously examined and the pulse signals of acceptable amplitude are transferred via gate 45 as a single pulse train to corresponding positions in channel 10*e*, channel 10*e* is examined and the pulse signals of acceptable amplitude are transferred to corresponding positions in channels 10*d* and 10*a*, channels 10*d* and 10*a* are simultaneously examined and the pulse signals of acceptable amplitude are transferred via gate 45 as a single pulse train to corresponding positions in the sprocket channel 10*f*. Therefore, a sprocket pulse signal train will again be recorded in sprocket channel 10*f* in every position which corresponds to the adjacent positions in channels 10*f*, 10*e*, 10*d*, 10*c*, 10*b* and 10*a* would have acceptable magnetic properties. Likewise, in a similar manner any number of channels may be simultaneously examined.

*Description of the method and apparatus for using a sprocketed magnetic tape*

Figure 2:
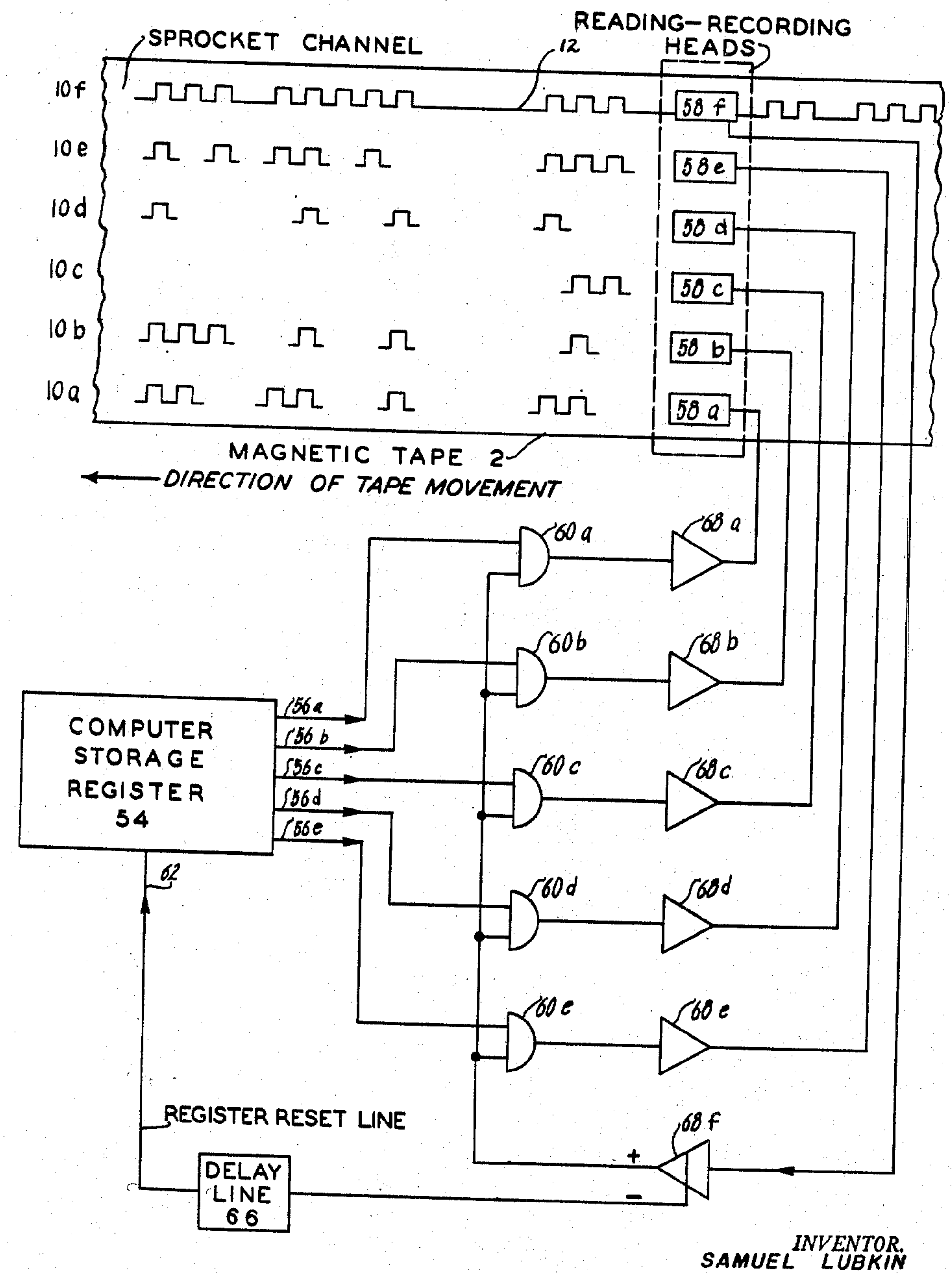
Figure 2 illustrates a fragmentary view of the processed tape including a block diagram illustrating how the sprocket signals control the transfer of information stored in a computer to the portions of the magnetic recording tape which are free from defects.

Apparatus for transferring information from a computer to the magnetic tape 2 under the control of the sprocket pulse signal train 12 is shown in Fig. 2.

The reading-recording heads 58*a*—58*e* sweep the respective channels 10*a*—10*e*, and the reading head 58*f* sweeps the sprocket channel 10*f* which contains the permanently recorded sprocket pulse signal train 12.

The information items to be transferred to the magnetic tape 2 are stored in the computer storage register 54. The signals corresponding to the stored information items are applied the output leads 56*a*—56*e*. The output leads 56*a*—56*e* are coupled respectively to the reading-recording heads 58*a*—58*e* via the series circuits including the gates 60*a*—60*e* and the pulse amplifiers 68*a*—68*e*. The reading head 58*f* is coupled to the register reset line 62 via the series circuit including the pulse amplifier 68*f* and the delay line 66. More particularly, the negative output signal of the amplifier 68*f* is delayed by the delay line 66 before being applied to the register reset line 62. The positive output of the pulse amplifier 68*f* is coupled to the remaining input of each of the gates 60*a*—60*e*.

The gates in the system are coincidence gates which comprise crystal diode networks. Each of the gates has two input terminals which are each coupled to crystal diodes. When positive signals are received via all of the input terminals of a gate, the gate transmits a positive signal. When negative signals are received via any of the input terminals of a gate, the gate transmits a negative signal. The gates are described in detail in the co-pending application of Samuel Lubkin, Serial No. 369,927, filed July 23, 1953 and assigned to the same assignee. The gates may also be of the type described in the U. S. patent of Alfred D. Scarbrough et al.; No. 2,685,039, issued July 27, 1954, and entitled "Diode Gating Circuits."

The combination of signals present at the output leads 56 prime the respective gates 60. When a sprocket pulse signal is present at the reading head 58*f*, the signal generated is amplified by the amplifier 68*f*. The positive output of amplifier 68*f* passes through the primed gates 60 and is amplified by amplifiers 68*a*—68*e* and recorded in the associated channels 10 by the associated reading-recording heads 58. The negative output of amplifier 68*f* is applied to the register reset line 62 after being delayed by delay line 66, to clear the computer storage register 54 for the next line of information item which will appear at the output leads 56. The next sprocket pulse signal will then control the recording of the next line of information items in the appropriate channels 10 of the magnetic tape 2.

Figure 3:
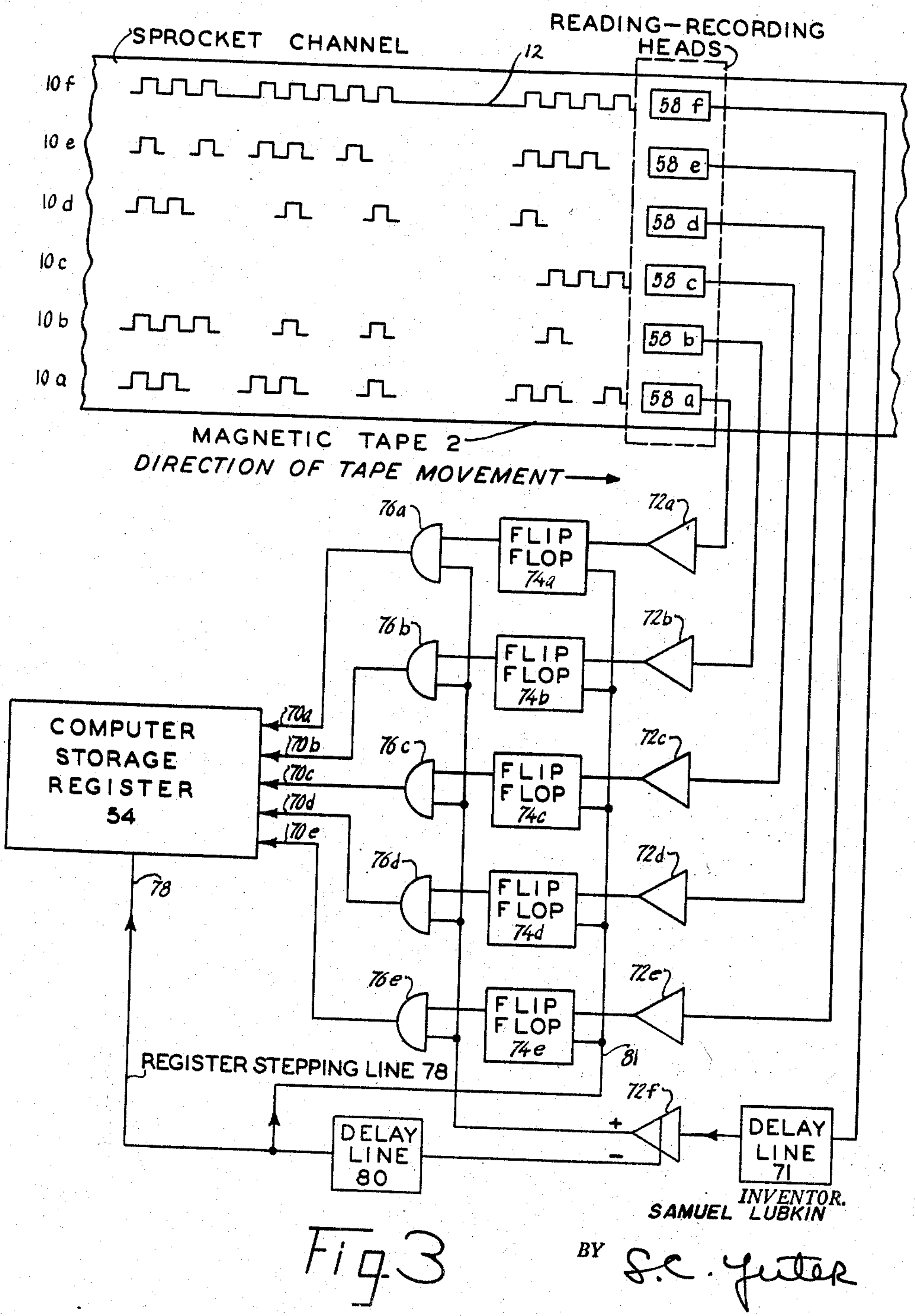
Figure 3 is a fragmentary view of the sprocketed magnetic recording tape and includes apparatus for transferring information items recorded on the tape to the computer storage register under control of the sprocket pulses.

Apparatus for transferring information to a computer from the magnetic tape 2 under control of the sprocket pulse signal train 12 is shown in Fig. 3.

The reading-recording heads 58*a*—58*e* sweep the respective channels 10*a*—10*e*, and the reading head 58*f* sweeps the sprocket channel 10*f* which contains the permanently recorded sprocket pulse signals.

The information items to be transferred to the computer storage register 54 are recorded on the magnetic tape 2. The signals corresponding to the information items recorded on magnetic tape 2 are sensed by the reading-recording heads 58*a*—58*e*. The reading-recording heads 58*a*—58*e* are coupled respectively to the input leads 70*a*—70*e* of the computer storage register 54 via the series circuits including the pulse amplifiers 72*a*—72*e* respectively, the flip-flops 74*a*—74*e* respectively, and the gates 76*a*—76E respectively. The reading head 58*f* is coupled to the register stepping line 78 via the series circuit including the delay line 71, the pulse amplifier 72*f* and the delay line 80. The delay line 71 functions to delay the sprocket pulse signals for a quarter of a pulse period before being applied to the pulse amplifier 72*f*, such that there is sufficient time for the information signals to trigger the flip flops 74*a*—74*e* and thereby prime gates 76*a*—76*e* before the sprocket pulse signals gate the information signals through the gates 76*a*—76*e* and reset the flip flops 74*a*—74*e*. More particularly, the delay sprocket pulse signals are applied to the pulse amplifier 72*f*. The positive output of the pulse amplifier 72*f* is applied to the gates 76*a*—76*e*, while the negative output of pulse amplifier 72*f* is delayed by the delay line 80 before being applied to both the register stepping line 78 and the flip flops 74*a*—74*e* via lead 81.

The combination of signals present at the reading-recording heads 58*a*—58*e* pass through the pulse amplifiers 72*a*—72*e* and trigger flip flops 74*a*—74*e*. The output of flip-flops 74*a*—74*e* prime the respective gates 76*a*—76*e*. When a sprocket pulse signal is present at the reading head 58*f*, the signal generated is applied to delay line 71 and delayed for a quarter of a pulse period before being applied to the pulse amplifier 72*f*. The positive output of amplifier 72*f* passes through the primed gates 76 to the input leads 70 of the computer storage register 54. The negative output of amplifier 72*f* is applied to delay line 80 and functions, via lead 81, to reset flip flops 74 preparing them for the next combination of signals which will appear at the reading-recording heads 58*a*—58*e* and, via lead 78, to step the first line of information items along and prepare the computer storage register 54 for the next line of information items which will appear at the output of the gates 76.

The next sprocket pulse signal will control the reading of the next line of information items in the appropriate channels 10 of magnetic tape 2.

While only one representative embodiment of the invention disclosed herein has been outlined in detail, there will be obvious to those skilled in the art, many modifications and variations accomplishing the foregoing objects and realizing many or all of the advantages, but which do not depart essentially from the spirit of the invention.

What is claimed is:

1. A system for transferring information items comprising a storage medium having areas for storing information items, portions of said storage medium having control data recorded therein for distinguishing between the areas of said storage medium which have acceptable and unacceptable information storage properties, and control means responsive to said control data for controlling the transfer of information items only to the areas of said storage medium which have acceptable storage properties.

2. A transfer system for transforming information to and from a tape having areas for storing information items, portions of said tape adjacent to said areas having control indicia recorded therein for distinguishing between the areas of said tape which have different storage properties, said transfer system comprising utilization means, transfer means coupled between said utilization means and said tape, and control means responsive to the control indicia for preventing the transfer of information items between said utilization means and the areas of said tape which have certain of the different storage properties.

3. A system for transferring information items comprising a storage medium having areas for storing information items, certain of said areas having acceptable storage properties, other of said areas having unacceptable storage properties, portions of said storage medium having control data recorded therein for distinguishing between the areas of said storage medium which have acceptable and unacceptable storage properties, utilization means, transfer means coupled between said utilization means and said storage medium, means for sensing said control data, and control means responsive to said sensing means for controlling said transfer means to transfer information items between said utilization means and said areas of said storage medium, said control means preventing the information items from being transferred to areas of said storage medium which have unacceptable storage properties.

4. A transfer device for transferring data comprising a magnetic tape having areas for storing data, portions of said magnetic tape corresponding to said areas and storing sprocket signals, said sprocket signals distinguishing between the areas of said magnetic tape which have acceptable and unacceptable storage properties, a data processor transfer means connected between said data processor and said magnetic tape, reading means for sensing said sprocket signals, and control means connected to said transfer means, said control means being responsive to the sprocket signals sensed by said reading means for preventing the transfer of data between said data processor and the areas of said magnetic tape having unacceptable storage properties.

5. A transfer system for transferring information items comprising a movable magnetic storage medium, a plurality of sprocket signals recorded on said magnetic storage medium for distinguishing between portions of said magnetic storage medium having different predetermined magnetic properties, recording means to record signals representing the information items in said magnetic storage medium, control means connected to said recording means, reading means for ascertaining the presence of said sprocket signals, utilization means, said control means being responsive to said reading means for conducting the information items between said utilization means and to said recording means whenever a sprocket signal is sensed by said reading means, said recording means being disabled by said control means to prevent recording the information items in sections of said magnetic storage medium that have certain of the predetermined magnetic properties.

6. A transfer system for transferring information items comprising a storage medium, information items being stored in first areas of said storage medium, other areas of said storage medium having control representations recorded therein for distinguishing between the first areas of said storage medium which have acceptable information storage properties and those which have unacceptable storage properties, recording means for recording said information items in the first areas of said storage medium, reading means for sensing said control representations, a computer, transfer means connected between said recording means and said computer, and control means connected to said transfer means and responsive to the control representations sensed by said reading means for preventing the transfer of information items between said computer and areas of said storage medium which have unacceptable storage properties.

7. A transfer device comprising a magnetic tape, certain areas of said magnetic tape being capable of storing information items, other areas of said magnetic tape adjacent to said certain areas and storing control data, said control data distinguishing between the areas of said magnetic tape which have acceptable and unacceptable magnetic properties, recording means for recording said information items in said certain areas of said magnetic tape, reading means for sensing said control data, a computer, transfer means, gating means thereof connected between said recording means and said computer, and control means connected to said gating means and responsive to the control data sensed by said reading means for preventing the transfer of information items between said computer and said certain areas of said magnetic tape having unacceptable magnetic properties.

8. A data storage system for an electronic digital computer comprising a storage medium for storing data therein, said storage medium being divided into a plurality of transversely spaced longitudinal channels, one of said channels operating as a sprocket channel while the remaining channels operate as data storage channels, said sprocket channel having a plurality of sprocket signals recorded therein, each of said sprocket signals being recorded in an area of said sprocket channel which is included in a transverse section of said storage medium which has acceptable data storage properties, recording means for recording data in said data storage channels, reading means associated with said sprocket channel for sensing the presence of said sprocket signals, a transfer device including gating means connected between said computer and said recording means, and control means connected to said gating means and responsive to said reading means for controlling the transfer of data from said computer to said recording means whenever a sprocket signal is sensed by said reading means to thereby record the data in said data storage channels.

9. A data transfer system comprising a tape composed of a base member having a thin layer of magnetizable material, said tape being divided into a plurality of transversely spaced longitudinal channels, one of said channels operating as a sprocket channel, the remainder of said channels operating as data storage channels, said sprocket channel having a plurality of sprocket signals recorded therein, said sprocket signals being absent only in areas of said sprocket channel which are included in transverse sections of said tape which have unacceptable magnetic properties, recording means for recording data in said data storage channels, reading means associated with said sprocket channel for sensing the presence of said sprocket signals, utilization means, a transfer device including gating means connected between said utilization means and said recording means and control means connected to said gating means and responsive to said reading means for preventing the transfer of data from said utilization means to said recording means whenever a sprocket signal is sensed by said reading means to thereby record data in said data storage channels.

10. A transfer device comprising a storage medium having information items stored in areas of said storage medium, portions of said storage medium having control representations recorded therein for distinguishing between areas of said storage medium having acceptable and unacceptable storage properties, and control means responsive to the control representations for transfer from the areas of said storage medium which have unacceptable storage properties.

11. A transfer system for transferring information items from a tape having information items stored in areas of said tape, portions of said tape corresponding to said areas having control representations recorded therein for distinguishing between the information storage areas of said tape which have acceptable and unacceptable storage properties, said transfer system comprising transfer means coupled to said tape, and control means coupled to said transfer means said control means being responsive to the control representations for preventing the transfer from the areas of said tape which have unacceptable storage properties.

12. A transfer system for transferring information items comprising a magnetic tape, the information items being stored in areas of said magnetic tape, portions of said tape adjacent to said areas having sprocket signals recorded therein for distinguishing between the areas of said magnetic tape which have acceptable and unacceptable storage properties, a computer to receive information items from said tape transfer means connected between said magnetic tape and said computer, reading means for sensing the sprocket signals, and control means connected to said transfer means and responsive to said reading means for preventing transfer from the areas having unacceptable storage properties.

13. A transfer system for transferring information items comprising a storage medium, the information items being stored in areas of said storage medium, other areas of said storage medium having control data recorded therein for distinguishing between areas having acceptable and unacceptable storage properties, a first reading means for sensing the information items, a second reading means for sensing the control data, transfer means connected to said first reading means, and control means connected to said transfer means and responsive to the control data sensed by said second reading means for preventing transfer from the areas having unacceptable storage properties.

14. A transfer system for transferring information items comprising a magnetized tape, the information items being stored in first areas of said magnetizable tape, second areas of said magnetizable tape being adjacent to said first areas and storing control signals, said control signals distinguishing between first areas of said magnetizable tape which have acceptable and unacceptable storage properties, a first reading means for sensing the information items stored in the first areas of said magnetizable tape, a second reading means for sensing the control signals recorded in said second areas, transfer means connected to said first reading means, and control means connected to said transfer means and responsive to the control signals sensed by said second reading means for controlling transfer from said magnetizable tape.

15. A transfer system comprising a storage medium having information items stored therein, said storage medium being laterally divided into a plurality of longitudinal channels, one of said channels operating as a sprocket channel, the remainder of said channels operating as data storage channels, said sprocket channel having a plurality of sprocket signals recorded therein, said data storage channels having a plurality of information items stored therein, each of said sprocket signals being recorded in positions distinguishing between sections of said storage medium having acceptable and unacceptable storage properties, a first reading means for sensing the sections of said storage medium wherein the information items are stored, a second reading means for sensing the presence of the sprocket signals, a transfer device connected to said first reading means, and control means being connected to said transfer device and being responsive to the sprocket signals sensed by said second reading means for controlling the transfer of information items from said storage medium.

16. A transferring system comprising a magnetizable tape having information items stored therein, said magnetizable tape being divided into a plurality of laterally spaced longitudinal channels, one of said channels operating as a sprocket channel, the remaining channels operating as data storage channels, said sprocket channel having a plurality of sprocket signals recorded therein, said data storage channels having a plurality of information items stored therein, each of said sprocket signals being recorded in positions to distinguish between sections of said magnetizable tape having acceptable and unacceptable storage properties, a first reading means for sensing the sections of said magnetizable tape wherein the information items are stored, a second reading means for sensing the sprocket signals, a computer transfer device including flip flops and gating means connected in series to said first reading means, and control means connected to said flip flops and said gating means, said control means being responsive to the sprocket signals for controlling the transfer of information items from said magnetizable tape to said computer.

References Cited in the file of this patent

UNITED STATES PATENTS

| | | |
|---|---|---|
| 1,863,479 | Hoover et al. | June 14, 1932 |
| 2,089,308 | Sullivan | Aug. 10, 1937 |
| 2,540,654 | Cohen et al. | Feb. 6, 1951 |
| 2,628,346 | Burkhart | Feb. 10, 1953 |
| 2,632,815 | Crespinel | Mar. 24, 1953 |

OTHER REFERENCES

Pages 120–122 of Automatic Digital Calculators by Booth and Booth, published in 1953, the preface being dated May 1953.

UNITED STATES PATENT OFFICE

CERTIFICATE OF CORRECTION

Patent No. 2,817,829 December 24, 1957

Samuel Lubkin

It is hereby certified that error appears in the printed specification of the above numbered patent requiring correction and that the said Letters Patent should read as corrected below.

Column 11, line 19, for "for transfer" read -- for preventing transfer --; line 61, for "magnetized" read -- magnetizable --; column 12, line 19, for "distinguishing" read -- to distinguish --.

Signed and sealed this 22nd day of April 1958.

(SEAL)

Attest:

KARL H. AXLINE

Attesting Officer

ROBERT C. WATSON

Commissioner of Patents